United States Patent [19]

Mitchell et al.

[11] Patent Number: 4,972,381

[45] Date of Patent: Nov. 20, 1990

[54] SONAR TESTING APPARATUS

[75] Inventors: Bruce C. Mitchell, Ellicott City; William F. Graugh, Jr., Pasadena, both of Calif.

[73] Assignee: Westinghouse Electric Corp., Pittsburgh, Pa.

[21] Appl. No.: 414,970

[22] Filed: Sep. 29, 1989

[51] Int. Cl.[5] .................... H04B 17/00

[52] U.S. Cl. .................... 367/13; 73/1 DV

[58] Field of Search .................... 367/13; 434/6, 9, 10; 73/1 DV

[56] References Cited

U.S. PATENT DOCUMENTS

| | | | |
|---|---|---|---|
| 4,034,483 | 7/1977 | Bernstein et al. | 434/9 |
| 4,259,732 | 3/1981 | Anderson et al. | 367/13 |

*Primary Examiner*—Thomas H. Tarcza

*Assistant Examiner*—Daniel T. Pihulic

*Attorney, Agent, or Firm*—D. Schron

[57] ABSTRACT

Test apparatus for a sonar system utilizing beam former circuitry wherein a quantitative test of the signal channels of the sonar system, including the transducers themselves may be automatically tested in situ utilizing the beamformer circuitry of the sonar system itself.

10 Claims, 8 Drawing Sheets

| | |
|---|---|
| CP1 → | G1 AT $r_1$ |
| CP2 → | G2 AT $r_1$ |
| CP3 → | sin Ø AT $r_1$ |
| CP4 → | cos Ø AT $r_1$ |
| CP5 → | G1 AT $r_2$ |
| CP6 → | G2 AT $r_2$ |
| CP7 → | sin Ø AT $r_2$ |
| CP8 → | cos Ø AT $r_2$ |

| | |
|---|---|
| CP(N−3) → | G1 AT $r_N$ |
| CP(N−2) → | G2 AT $r_N$ |
| CP(N−1) → | sin Ø AT $r_N$ |
| CPN → | cos Ø AT $r_N$ |

BLOCK 10

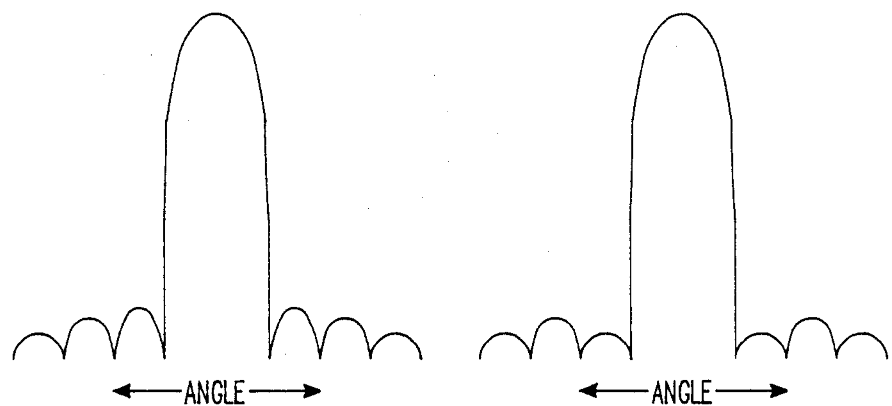
FIG. 6A
FIG. 6B
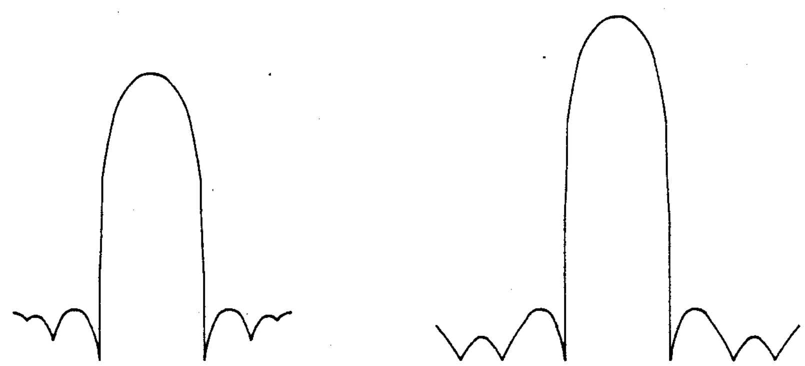
FIG. 7A
FIG. 7B

| | |
|---|---|
| CP1 | G1 = 0 |
| CP2 | G2 = 0 |
| CP3 | sin Ø = 0 |
| CP4 | cos Ø = 0 |
| CP5 | G1 = 0 |
| CP6 | G2 = 0 |
| CP7 | sin Ø = 0 |
| CP8 | cos Ø = 0 |
| CP9 | G1 ≠ 0 |
| CP10 | G2 ≠ 0 |
| CP11 | sin Ø ≠ 0 |
| CP12 | cos Ø ≠ 0 |
| | |
| CP4n | cos Ø = 0 |
| | REPEAT |

SONAR TESTING APPARATUS

BACKGROUND OF THE INVENTION

1. Field of the Invention

This invention in general relates to apparatus for testing sonar systems, and more particularly to sonar systems having beamformer circuitry for forming one or more high resolution receiver beams.

2. Background Information

Various types of sonar systems such as sector scan and side-looking sonars utilize electronic beamformer circuitry to form one or more very narrow high resolution beams for acoustically examining a target area. The sonar system must be tested periodically to ensure that it is in proper operating condition and for this purpose many systems include built in test equipment (BITE). By operator switch selection of BITE, a test signal is introduced into the sonar receiver front end which produces a test pattern on a display. Although this technique is less time consuming and less costly than bench testing or test range measurement, current BITE systems are inadequate for locating faults which degrade beam pattern shapes. Only a qualitative result is obtained in that a BITE signal injected into the front end of the sonar receiver will show up on the display thereby informing the operator that there is a signal route through. Current BITE arrangements will not indicate in a quantitative manner the degree to which something is wrong with the sonar receiver and associated transducer elements. It is the beam pattern shape, including the effects from the transducer elements, which should be used to judge system performance level. The apparatus of the present invention will provide a quantitative indication of malfunction and will do so even during in situ operation of the sonar apparatus.

SUMMARY OF THE INVENTION

In the present invention, apparatus is provided for testing a sonar system which has an array of active transducer elements normally providing output signals to respective preamplifiers in response to impingement of acoustic energy. This acoustic energy may be that which is reflected back from a target area under investigation. The outputs of the preamplifiers are provided to beamformer circuitry which impart predetermined phase shifts and gains to the preamplifier outputs. With the present invention, a signal generator means is operable to inject a test signal into a selected number of said preamplifiers and in one embodiment, the identical signal is injected into the selected preamplifiers for far field testing and in another embodiment predetermined different signals are injected for near field testing. Control means are provided for operating the beamformer circuitry to impart predetermined phase shifts and gains to the outputs of those preamplifiers injected with the test signal just as the beamformer circuitry would do under normal operating conditions of the sonar apparatus. Means are additionally provided for utilizing the output of the beamformer circuitry for diagnostic purposes.

BRIEF DESCRIPTION OF THE DRAWINGS

FIGS. 6A and 6B illustrate displayed beam forms for normal operation;

FIGS. 7A and 7B illustrate displayed beam forms which may occur as a result of a malfunction;

DESCRIPTION OF THE PREFERRED EMBODIMENTS

Figure 1:
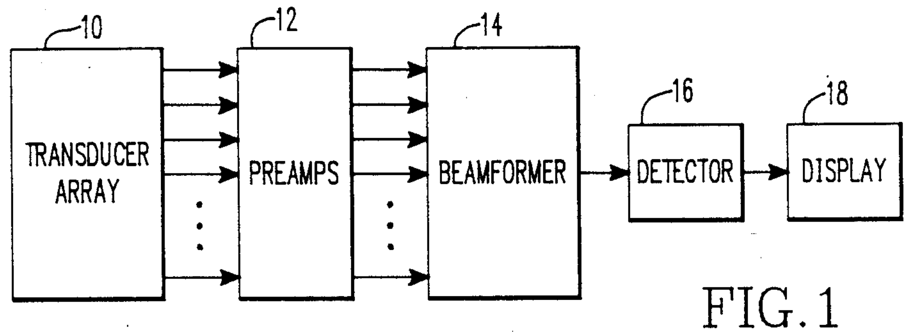
FIG. 1 is a block diagram of a typical sonar system utilizing beamformer circuitry.

The typical sonar system illustrated in FIG. 1 includes a transducer array 10 formed of a plurality of transducer elements of transducer active material for the projection and/or reception of acoustic energy. In the present example a separate transducer or transducer array (not illustrated) is operable to project acoustic energy toward the target area, in which case the transducer array 10 receives the acoustic returns and each transducer element operates as a hydrophone.

The outputs of the transducer elements are initially amplified by a series of preamplifiers 12, the outputs of which are provided to beamformer circuitry 14 operable to electronically form one or more beams which are detected by means of detector 16 and provided to display 18.

Figure 2:
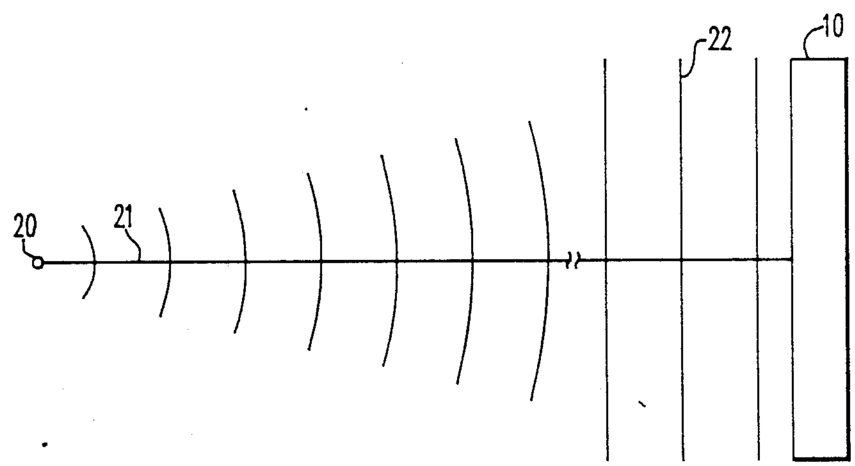
FIG. 2 illustrates the position of a simulated point source relative to the sonar transducer array for one mode of operation of the present invention.

In one embodiment of the present invention, a test signal is injected into the system to simulate a point source 20 directly on boresight 21, as illustrated in FIG. 2. With point source 20 at infinity or in the far field, the initially spherical waves emitted by the point source are, when impinging upon the transducer array 10, essentially planar, as represented by wave crest 22. The apparatus for simulating this operation is further illustrated in FIGS. 3–5C.

Figure 3:
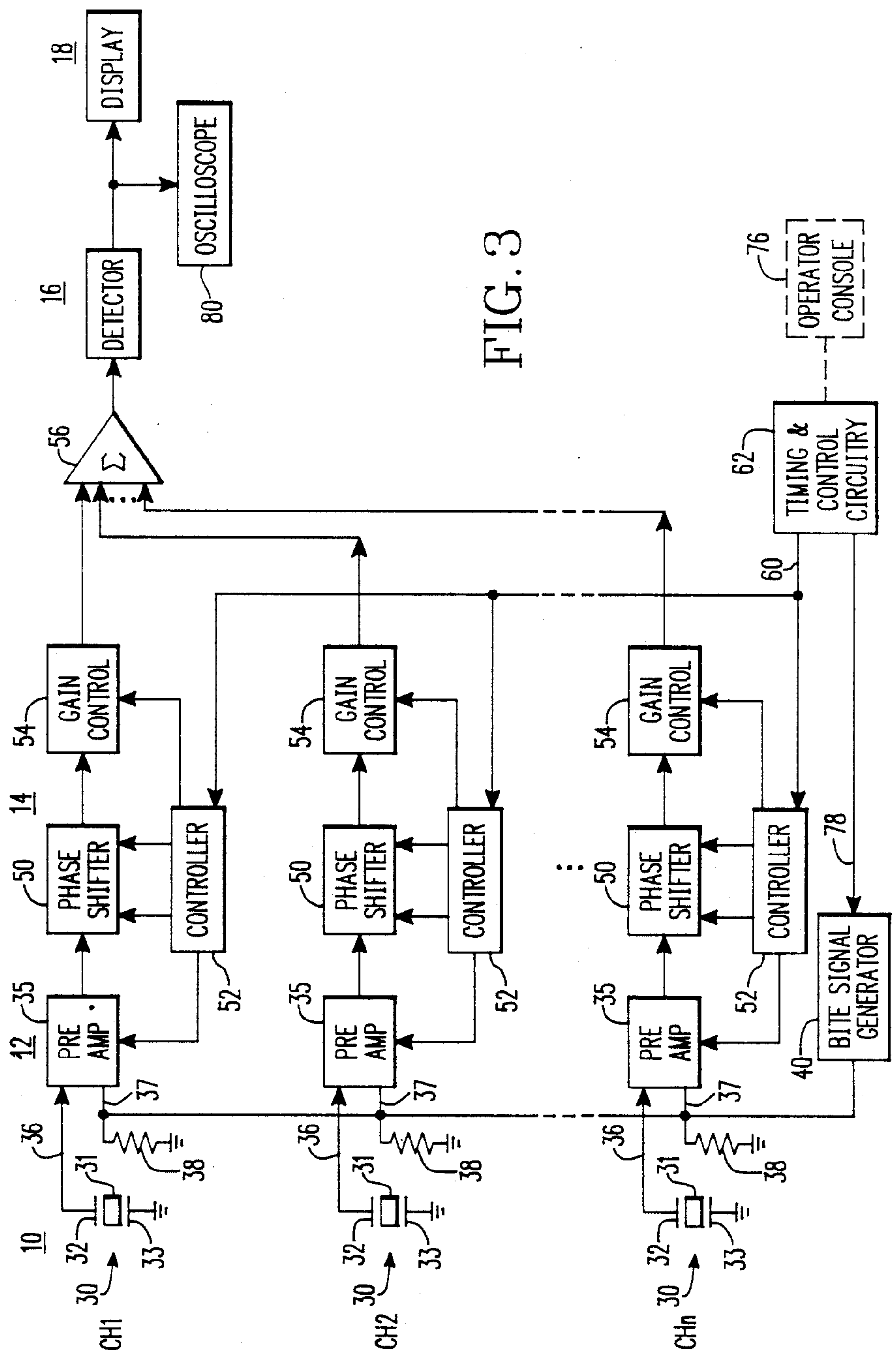
FIG. 3 is a block diagram showing one embodiment of the present invention in conjunction with the typical sonar system of FIG. 1.

In FIG. 3 the sonar apparatus includes a plurality of identical channels CH1, CH2...CHn, with each channel including a respective element 30 formed of transducer active material 31 sandwiched between first and second electrodes 32 and 33. In response to impingement of acoustic energy, a typical transducer element 30 will provide an output signal to preamplifier 35 by virtue of the electrical connection from first electrode 32 to a first preamplifier input 36. Preamplifier 35 has an additional or second input 37 which in normal operation is connected directly to ground potential. In a preferred embodiment of the present invention however, a resistor 38 is connected between input 37 and ground potential and an input test signal from BITE signal generator 40 is applied, not to first input 36, but to the second input 37 so that the test signal current flows through resistor 38 as well as through transducer element 30 thereby including the transducer element in the test.

During normal operation of the sonar, the outputs of the transducer elements are phase (or time) shifted by a predetermined amount and the phase shifted signals in all of the channels are combined to form a single beam output signal. This is accomplished by way of example, with the provision of a phase shifter 50, the operation of which is governed by a controller 52. The phase shifting operation is followed by amplification in gain circuit 54 and the amplified and phase shifted signals from all of the channels are collectively provided to summer 56 which provides a beam signal to detector 16 for display purposes.

In addition to controlling the phase shifting operation, the controller 52 is also operable to set the gain of preamplifier 35 as well as gain circuit 54, all in response to signals on bus 60 from timing and control circuitry 62.

Figure 4:
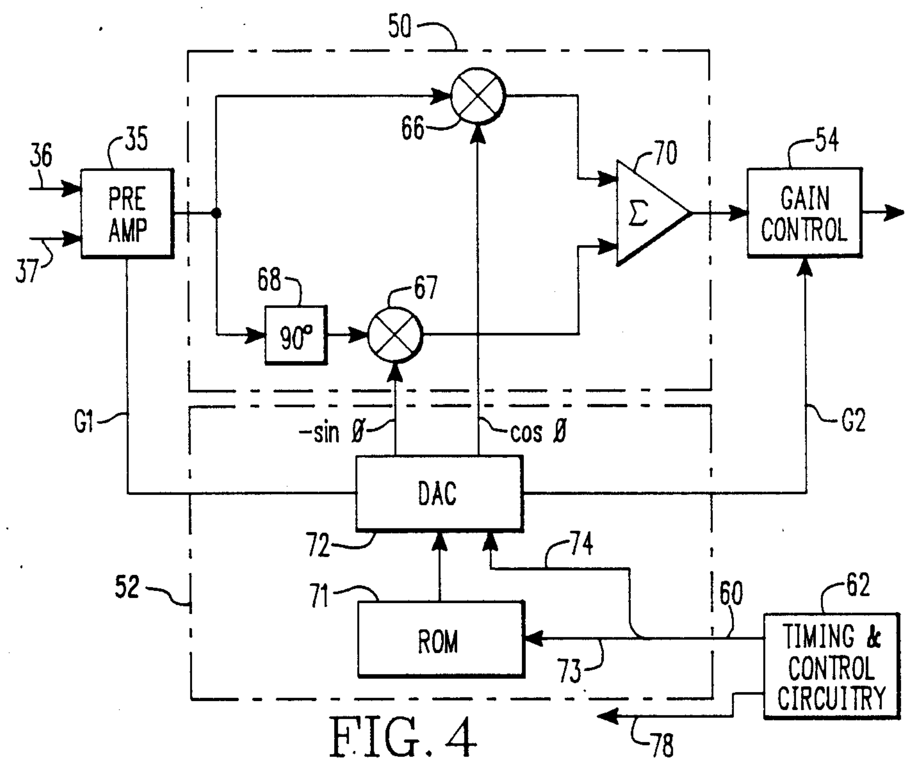
FIG. 4 is a block diagram illustrating some circuits of FIG. 3 in more detail.

The phase shifter and controller are shown in somewhat more detail in FIG. 4. In one well-known arrangement, preamplifier 35 provides its output signal to two linear multipliers 66 and 67 of phase shifter 50. Multiplier 67 is preceded by a 90° phase shifter and the results of the linear multiplication are provided to a summer 70 the output of which is the phase shifted signal. The phase shifting is accomplished by multiplication of the preamplifier signal and phase shifted preamplifier signal by respective values of cosine $\phi$ and sine $\phi$, where $\phi$ is the known needed phase shift required for the channel signal to line up in phase with the other channel signals. The known sine $\phi$ and cosine $\phi$ values are stored in digital form by way of example, in a read only memory (ROM) 71 which outputs the necessary values in response to signals on bus 60. The ROM also provides the necessary gain values for preamplifier 35 and gain circuit 54 and during operation the output of the ROM is provided to a digital-to-analog converter (DAC) 72 which holds the outputted ROM values for the gains and sine $\phi$ and cosine $\phi$, until updated.

Bus 60 carries a plurality of lines, some of which 73, branch off to control ROM 71 and others of which 74, branch off to the DAC 72. As will be explained, signals on lines 73 select a particular BLOCK or page of memory locations in the ROM 71. Clocking pulses from the timing and control circuit 62 are provided to an internal range counter during normal operation of the sonar system. Each time a clock pulse is received, the range counter is operable to generate a new address signal so that in response to the clock signals, the contents of the selected BLOCK are sequentially read out and provided to the DAC 72.

Thus during normal operation, with reference once again to FIG. 3, each of the controllers 52 have a priori stored values which are utilized in response to the proper timing and control signals on bus 60 to impart the proper phase shift and gains to each of the transducer element outputs of all of the channels to generate a beam signal. This same operation is utilized in the present invention to phase shift and form a beam signal, not in response to an acoustic signal, but in response to injection of a test signal from BITE signal generator 40.

If the carrier vehicle upon which the sonar system is mounted is unattended, switching from normal operation to a BITE operation may be governed automatically by the timing and control circuitry 62. For manned operation, control may be by means of operator input at operator console 76. When a BITE test is to be performed, the operator and/or timing and control circuitry 62 provides an indication thereof on line 78 to the BITE signal generator 40 which then provides a continuous wave (CW) signal to each the resistors 38 at the respective second inputs 37 of the preamplifiers 35.

Figure 5A:
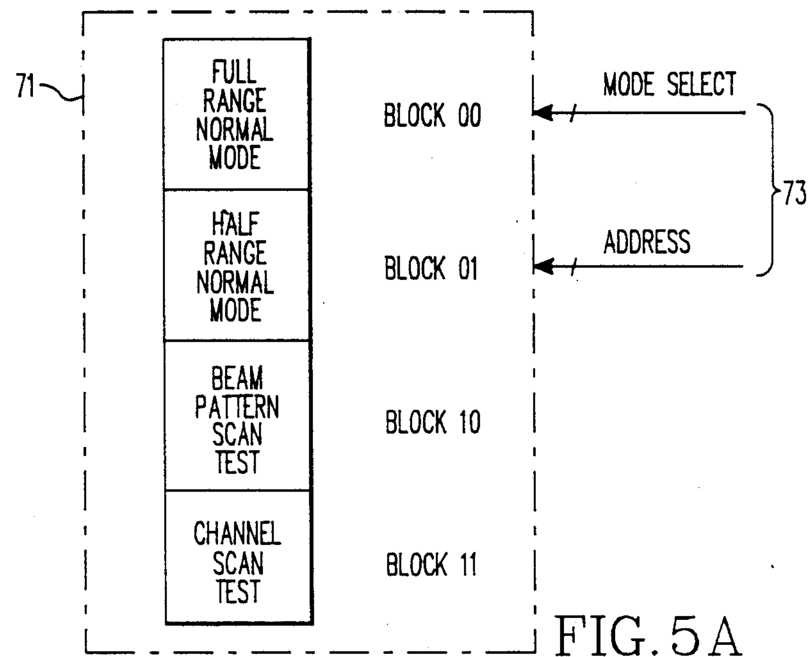
FIG. 5A–5C illustrates the arrangement of the memory used for normal and BITE operations.
Figures 5B, 5C:
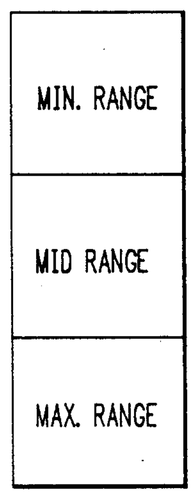

The operation of the normal sonar system as well the present invention may be explained with additional reference to FIGS. 5A through 5C. The memory of each ROM 71 is divided into a plurality of BLOCKS, each block containing a plurality of memory locations into which are loaded the known gain values, as well as the sine $\phi$ and cosine $\phi$ values for that particular channel in which the ROM is located. During normal sonar operation, the mode select lines illustrated in FIG. 5A will select BLOCK 00 which is cycled through all of its memory locations by means of the address signals provided by the counter of the timing and control circuitry 62.

The content of a typical BLOCK is illustrated in FIG. 5B. Upon the occurrence of a first range clock pulse CP1, the first address signal is generated and the value of G1 is read out of memory, the value of G2 is read out upon the occurrence of the second clock pulse CP2, sine $\phi$ is read out at the third clock pulse CP3 and cosine $\phi$ at the fourth clock pulse CP4. In the example illustrated therefor, four clock pulses generate the address signals to read out the four values needed for one range increment $r_1$. Continued application of the range clock pulses to the address generating range counter causes the sequentially read out of the values for other range increments up to range increment $r_N$ whereupon a subsequent acoustic transmission takes place and the range clock is reset to repeat the operation.

Some sonar systems operate in a higher resolution half range mode and if this half range mode is desired, the BLOCK 01 is selected by the appropriate signals on the mode select lines. The readout operation of BLOCK 01 is identical to that of BLOCK 00, however, for the half range mode, different gain, sine $\phi$ and cosine $\phi$ values are utilized.

With the present invention, additional BLOCKS of memory are added to the unused portion of the ROM or alternatively, an additional ROM (or other memory) may be added. In FIG. 5A, two additional BLOCKS of memory have been added to ROM 71 for conducting BITE tests. BLOCK 10 contains the values of gain, sine $\phi$ and cosine $\phi$ for performing a beam pattern scan test and BLOCK 11 contains the values for testing of individual channels. Two mode select lines may be provided for carrying a binary selection signal. In a first mode of operation, the normal mode, provision of a binary 00 will select BLOCK 00 while provision of a binary 01 will select BLOCK 01. Similarly, for the second mode of operation, the test mode, provision of a binary 10 will select BLOCK 10 for the beam pattern scan test and a binary 11 will select BLOCK 11 for the channel gain scan test. The range clock pulses and range counter may be conveniently used for sequentially reading out the contents of BLOCKS 10 and 11. However, instead of representing values for different range increments the memory contains values for scanning the beam in angle.

During normal sonar operation, after a transmission, only several contiguous channels are initially turned on to receive the acoustic reflections and thereafter the array is made longer by adding more channels as the range of the expected returns increases. If there is a failure of one of the elements or channels used at short range Where only several channels are utilized, it will have a far greater effect on the beam pattern than if all n channels are utilized and one fails. Accordingly, the beam pattern test may test the array for a plurality of different range increments, either by placing the predetermined values required in additional memory BLOCKS, or as illustrated in FIG. 5C by incorporating, by way of example, minimum range, midrange and maximum range values in BLOCK 10. In view of the fact that gain, sine $\phi$ and cosine $\phi$ values are being provided by BLOCK 10 during a beam pattern scan test, beamformer circuitry 14 will perform its normal beamforming operation on the test signal provided to all of the channels by BITE signal generator 40. After summation and detection, the results of the test may be presented to a utilization means such as an oscilloscope 80 illustrated in FIG. 3.

FIGS. 6A and 6B represent the normal beam patterns obtained, for example, utilizing eight channels, (FIG. 6A) or all n channels (FIG. 6B) where n may be 22. In general, the resolution of the array increases as more channels are utilized such that the beamwidth presented for 22 channels will be much thinner than that for the eight channel case. In order to make the beam pattern display fairly normalized so that the beam patterns are of the same width for easier operator interpretation, the stored values for gain, sine $\phi$ and cosine $\phi$ are repeated. For example, at maximum range, the beam width may be 10 times narrower than at short range. Accordingly, even though the same scan rate is applied, the maximum range values will be repeated 10 times before changing for the next beam angle increment.

Although not illustrated, if a midrange pattern is to be displayed, it will be similar to the short range and maximum range patterns of FIGS. 6A and 6B.

If one or more failures occur to degrade operation, the beam pattern will change, such as illustrated in FIGS. 7A and 7B. FIGS. 7A represents the minimum range case and it is seen that the amplitude of the main lobe has decreased and the side lobes have changed considerably. In FIG. 7B, representing the maximum range beam pattern, an operator can look at the side lobes and determine that a malfunction as occurred. Alternatively, threshold circuits may be provided so that such determination of malfunction may be make automatically.

Figures 8, 9:
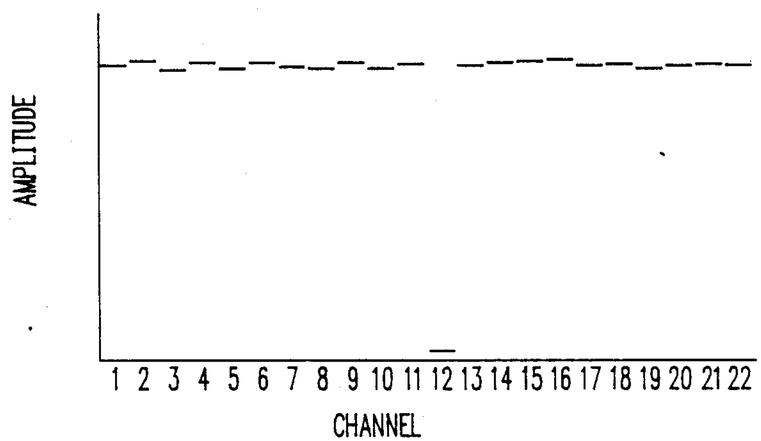
FIG. 8 illustrates the arrangement of memory used for a channel scan test.
FIG. 9 illustrates a display for determining a failed channel in the sonar system.

If a determination has been made that a malfunction has occurred, then an individual channel testing program may be initiated by switching to BLOCK 11. In the channel scan test, only one channel at a time is enabled so that the BITE signal generator test signal, although applied to the preamplifiers of all channels, will be passed through individual channels one at a time in a sequential manner. FIG. 8 illustrates the data that will be placed in BLOCK 11 of the ROM 71 for the third channel CH3. Upon the occurrence of the first four address signals generated by clock pulses CP1–CP4 all the gain and sine $\phi$, cosine $\phi$ values are read out and are zero so that channel three does not pass the test signal (although channel CH1 will). For the next four clock pulses CP5–CP8 the same zero values are read out. Non-zero values however are read out for the four clock pulses CP9–CP12 so that channel CH3 may now be tested and thereafter the remaining addresses all have zero values. After the last channel, CHn, is tested, the test may be repeated for as many times as the data can be accommodated in BLOCK 11.

The results of the channel scan test may be displayed on oscilloscope 80, such display, being portrayed in FIG. 9. The vertical scale in the display of FIG. 8 represents the amplitude of the signal passed by each individual channel and the horizontal scale represents the channel number. For the example illustrated n would be 22 and the results of the scan indicate that in response to the application of the test signal, channels 1 though 11 and 13 through 22 all illustrate signal amplitudes within allowed limits whereas channel 12 indicates a failure.

Figure 10:
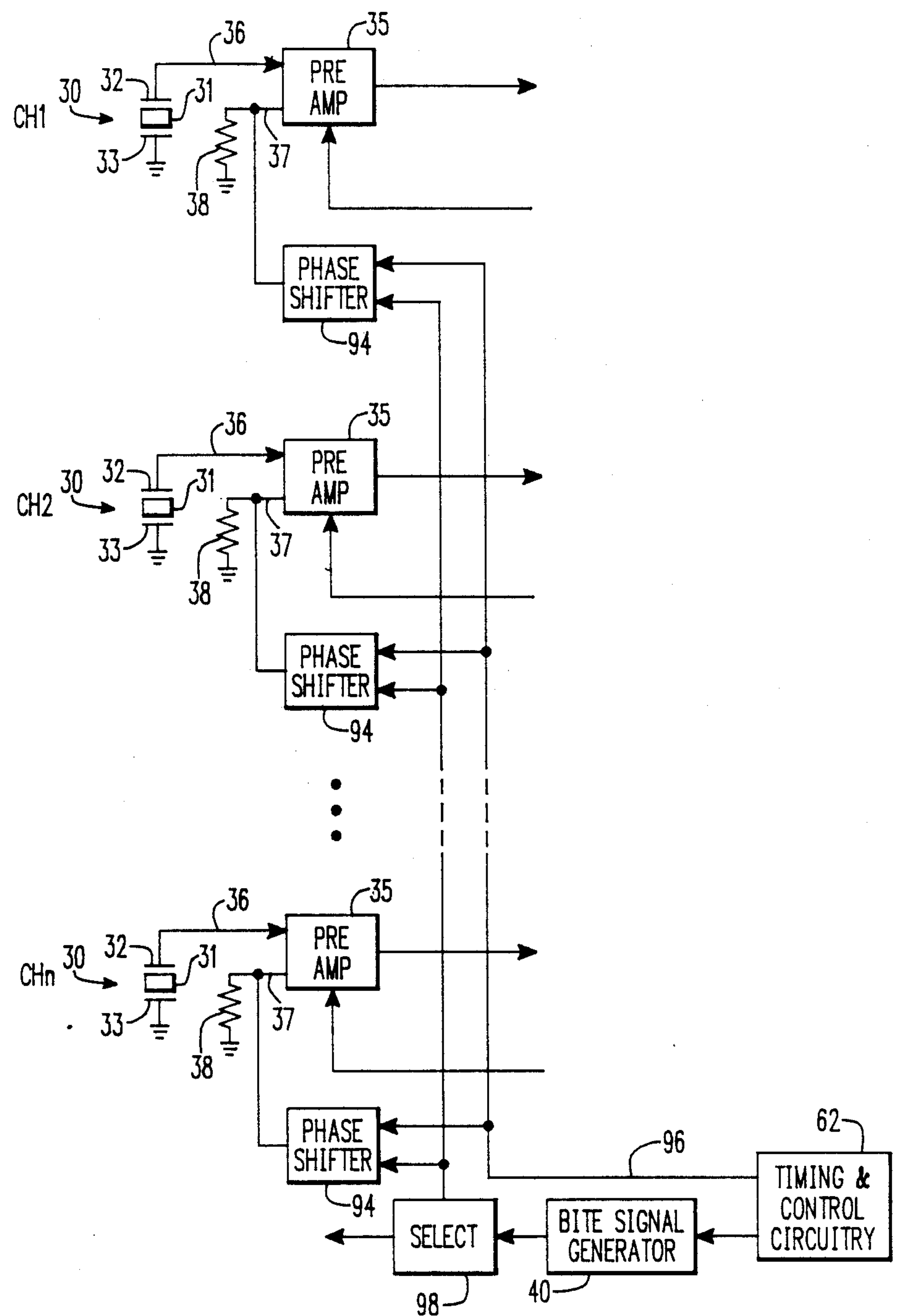
FIG. 10 illustrates another embodiment of the present invention.
Figure 11:
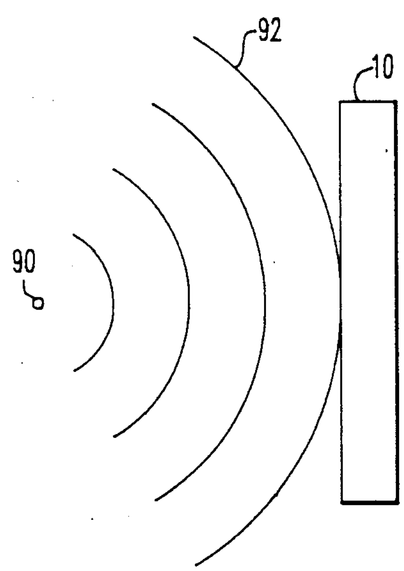
FIG. 11 illustrates a point source in the near field relative to the sonar transducer array.

In the embodiment of FIG. 3, the application of the test signal from BITE signal generator 40 to all of the channels simultaneously simulates the acoustic emission from a point source at infinity along the boresight, as indicated at FIG. 2. FIG. 10 illustrates an embodiment of the invention for simulating a point source in the near field as illustrated in FIG. 11 wherein an acoustic wave emanating from point source 90 does not impinge upon all of the transducer elements of the array at the same time, as indicated by spherical wave 92.

In the embodiment illustrated in FIG. 10, the BITE signal generator 40 will provide the same test signal, however, prior to application of the test signal to a preamplifier 35, the test signal is first phase shifted by preselected amounts in respective phase shifters 94. These phase shifters may be digitally controlled phase shifters operable to provide predetermined phase shifts to the test signal in response to commands on bus 96 from the timing and control circuitry 62. It is understood that the embodiment of FIG. 10 may be used as a stand alone system or may, with facility be incorporated into the embodiment of FIG. 3 with the provision of a selection switch 98 operable to provide the test signal from the BITE signal generator 40 to either the phase shifters 94 as in the embodiment of FIG. 10 or directly to the resistors 38, as in the embodiment of FIG. 3.

We claim:

1. Apparatus for testing a sonar system having an array of active transducer elements having an associated boresite and which transducer elements normally provide output signals to respective preamplifiers in response to impingement of acoustic energy, with the output of the preamplifiers being included in and provided to respective channels of beamformer circuitry which imparts predetermined phase shifts and gains to the preamplifier outputs, the improvement comprising:

(a) signal generator means operable to inject a test signal into said preamplifiers to simulate a point source of acoustic energy lying along the boresite of the array;

(b) said beamformer including control means for operating said beamformer circuitry to impart predetermined phase shifts and gains to the outputs of selected preamplifiers injected with said test signal, just as said beamformer circuitry would do under normal beam through said point source; and (c) means for utilizing the output of said beamformer circuitry.

2. Apparatus according to claim 1 wherein:

(a) said means for utilizing is a display operable to display the beam pattern associated with said array.

3. Apparatus according to claim 1 wherein:

(a) the identical test signal is simultaneously injected into all of said preamplifiers.

4. Apparatus according to claim 3 wherein:

(a) said test signal is a CW signal.

5. Apparatus according to claim 1 wherein:

(a) said control means is operable to initially block a predetermined number of preamplifier outputs from the beamformer process, and thereafter include all of the preamplifier outputs in the beamformer process.

6. Apparatus according to claim 1 wherein:

(a) each said preamplifier includes a first and second input;

(b) each said transducer element includes first and second electrodes, with said first electrode being connected to said first input; and which includes, (c) a resistor connected in circuit between said second electrode and said second input;

(d) said test signal being applied to said second input so that current is injected into said first input through said transducer element.

7. Apparatus according to claim 1 wherein:

(a) said control means is additionally operable to test said channels one at a time.

8. Apparatus according to claim 7 wherein:

(a) said means for utilizing is a display operable to collectively display the amplitude of the signal passed in each said channel.

9. Apparatus according to claim 1 which includes:

(a) phase shifting circuitry interposed between said signal generating means and each said preamplifier and operable such that not all of said preamplifiers receive the same injected signal.

10. Apparatus according to claim 1 which includes:

(a) an operators console whereby an operator can selectively switch from normal sonar operation to a test operation and vice versa.

* * * * *